US010890052B2

United States Patent
Pei et al.

(10) Patent No.: US 10,890,052 B2
(45) Date of Patent: Jan. 12, 2021

(54) DOWNHOLE POWER GENERATION DEVICE AND SEPARATE-ZONE WATERFLOODING DEVICE

(71) Applicant: PetroChina Company Limited, Beijing (CN)

(72) Inventors: Xiaohan Pei, Beijing (CN); Qinghai Yang, Beijing (CN); Dongbai Shan, Beijing (CN); Tao Li, Beijing (CN); Eryang Ming, Beijing (CN); Ming Li, Beijing (CN)

(73) Assignee: PETROCHINA COMPANY LIMITED, Beijing (CN)

( * ) Notice: Subject to any disclaimer, the term of this patent is extended or adjusted under 35 U.S.C. 154(b) by 126 days.

(21) Appl. No.: 16/053,568

(22) Filed: Aug. 2, 2018

(65) Prior Publication Data
US 2019/0292883 A1  Sep. 26, 2019

(30) Foreign Application Priority Data
Mar. 23, 2018  (CN) .......................... 2018 1 0243003

(51) Int. Cl.
*E21B 41/00* (2006.01)
*E21B 43/20* (2006.01)
*H02N 2/18* (2006.01)

(52) U.S. Cl.
CPC .......... *E21B 41/0085* (2013.01); *E21B 43/20* (2013.01); *H02N 2/186* (2013.01)

(58) Field of Classification Search
CPC ..... E21B 41/0085; E21B 43/20; H02N 2/186; H02N 2/185; H02N 2/183; H02N 2/18
See application file for complete search history.

(56) References Cited

U.S. PATENT DOCUMENTS

2006/0086498 A1\*  4/2006  Wetzel .................... E21B 47/00
                                                          166/250.12
2010/0219646 A1    9/2010  Hay
                          (Continued)

FOREIGN PATENT DOCUMENTS

| CN | 201013526 Y | 1/2008 |
| CN | 102105650 A | 6/2011 |

(Continued)

OTHER PUBLICATIONS

Second Office Action dated Sep. 25, 2019 for counterpart Chinese Patent Application No. 201810243003.6 and an English translation thereof.

*Primary Examiner* — George S Gray
(74) *Attorney, Agent, or Firm* — Loza & Loza, LLP; Michael F. Fedrick

(57) ABSTRACT

A downhole power generation device and a separate-zone waterflooding device, which relate to the field of oil and gas development technologies. The downhole power generation device comprises a housing extended axially and a rotating wheel, a striking mechanism and a piezoelectric bimorph provided in the housing. The piezoelectric bimorph is axially extended and circumferentially distributed around an axis of the housing, with one end of the piezoelectric bimorph being fixed. The rotating wheel is in transmission connection with the striking mechanism and can be rotated by fluid to drive the striking mechanism to rotate. The striking mechanism can touch the other end of the piezoelectric bimorph during rotation so that the piezoelectric bimorph vibrates back and forth.

10 Claims, 4 Drawing Sheets

(56) References Cited

U.S. PATENT DOCUMENTS

| | | | |
|---|---|---|---|
| 2011/0198848 A1 | 8/2011 | Rytlewski et al. | |
| 2012/0219646 A1 | 8/2012 | Whitmire et al. | |
| 2013/0207520 A1* | 8/2013 | Near .................. | H02N 2/186 310/339 |
| 2016/0164437 A1* | 6/2016 | Kim .................... | H02N 2/183 310/339 |
| 2018/0155991 A1* | 6/2018 | Arsalan ............... | E21B 47/06 |

FOREIGN PATENT DOCUMENTS

| | | |
|---|---|---|
| CN | 102158011 A | 8/2011 |
| CN | 103312216 A | 9/2013 |
| CN | 104514666 A | 4/2015 |
| WO | 03017390 A1 | 2/2003 |

\* cited by examiner

US 10,890,052 B2

DOWNHOLE POWER GENERATION DEVICE AND SEPARATE-ZONE WATERFLOODING DEVICE

CROSS-REFERENCE TO RELATED APPLICATION

This application claims the benefit of priority under 35 U.S.C. § 119 from Chinese Patent Application No. 2018102430036, which was filed on Mar. 23, 2018 and titled as "DOWNHOLE POWER GENERATION DEVICE AND SEPARATE-ZONE WATERFLOODING DEVICE". The entire disclosure of the foregoing application is incorporated herein by reference.

TECHNICAL FIELD

The present invention relates to the field of oil and gas development technologies, and particularly, to a downhole power generation device and a separate-zone waterflooding device.

BACKGROUND ART

The waterflooding development is one of the important measures for improving the recovery efficiency in the middle and later periods of an oil field. In order to improve the effect of the waterflooding development as far as possible, different amounts of waterflooding can be achieved for different reservoirs by selecting a manner of intelligent separate-zone waterflooding.

The intelligent separate-zone waterflooding is an advanced technology which reasonably allocates the waterflooding amount for each reservoir based on the pressure, flow rate and other data of the reservoir acquired by the downhole sensor, thereby achieving a scientific waterflooding. In general, the downhole waterflooding devices for the intelligent separate-zone waterflooding are mostly powered by disposable or rechargeable batteries, and their service lives are limited. Moreover, the battery replacement or charging requires that the entire system should be taken out from a depth of several kilometers downhole, or the charger should be accurately placed to a position very close to the downhole waterflooding tool to wirelessly charge the battery for replacing or charging the battery. The above operation methods is laborious and time consuming

SUMMARY OF THE INVENTION

In order to overcome the above defects of the prior art, the technical problem to be solved in the embodiments of the present invention is to provide a downhole power generation device and a separate-zone waterflooding device, which are capable of collecting energy for waterflooding so as to provide stable and continuous electric energy, thereby prolonging or even avoiding the replacement of the downhole power supply equipment.

The specific technical solutions of the embodiments of the present invention are as follows:

a downhole power generation device, comprising:
a housing extended axially;
a rotating wheel, a striking mechanism and a piezoelectric bimorph provided in the housing; wherein the piezoelectric bimorph is axially extended and circumferentially distributed around an axis of the housing, one end of the piezoelectric bimorph is fixed, the rotating wheel is in transmission connection with the striking mechanism, the rotating wheel can be rotated by fluid to drive the striking mechanism to rotate, and the striking mechanism can touch the other end of the piezoelectric bimorph during rotation so that the piezoelectric bimorph vibrates back and forth. In a preferred embodiment, the downhole power generation device further comprises: a lower guide vane mechanism sleeving a shaft of the rotating wheel and located downstream of the rotating wheel, wherein the lower guide vane mechanism comprises a plurality of radially extended lower guide vane portions which are fixedly connected to the housing In a preferred embodiment, a connecting member is connected to the lower guiding blade to fix one end of the piezoelectric bimorph.

In a preferred embodiment, the housing comprises an upper outer barrel and a lower outer barrel connected to the upper outer barrel, and the lower guide vane mechanism is fixed to a joint between the upper outer barrel and the lower outer barrel.

In a preferred embodiment, the downhole power generation device further comprises: an upper guide vane mechanism sleeving a shaft of the rotating wheel and located upstream of the rotating wheel.

In a preferred embodiment, the other end of the piezoelectric bimorph is connected to a counterweight member.

In a preferred embodiment, the counterweight member is connected to a touched member which can be touched by the striking mechanism during rotation.

In a preferred embodiment, the housing is provided therein with a guiding member which has a radial guiding groove perpendicular to the housing, and the touched member is embedded into the guiding groove.

In a preferred embodiment, the number of the piezoelectric bimorphs is three, and an angle between adjacent two of the piezoelectric bimorphs is 120 degrees; the number of the guiding members is three, and an angle between adjacent two of the guiding grooves is 60 degrees.

In a preferred embodiment, two of the connecting members clamp the piezoelectric bimorph, and a side surface of the connecting member away from the piezoelectric bimorph is an arc surface.

A separate-zone waterflooding device, comprising a downhole power generation device as described above is also provided.

The technical solutions of the present invention achieve the following obviously advantageous effects:

The downhole power generation device in the present application can convert the kinetic energy of the water flow into mechanical energy, and further convert the mechanical energy into electric energy through the piezoelectric bimorph, while the electric energy is generated persistently along with the continuous water flow during the waterflooding process. The electric energy generated by the downhole power generation device may be led out via wires and then supplied to a load such as the battery or a power consumption device through corresponding rectifying circuit. The structure of the downhole power generation device can meet the volume requirement for being placed into the downhole device, so that it can be connected to the separate-zone waterflooding device and placed underground to provide stable and continuous electric energy for a power consumption system such as the separate-zone waterflooding device, thereby prolonging or even avoiding the replacement of the downhole power supply equipment and increasing the waterflooding cycle.

With reference to the following descriptions and drawings, the particular embodiments of the present invention are disclosed in detail to indicate the ways in which the principle of the present invention can be adopted. It should be understood that the scope of the embodiments of the present invention are not limited thereto. The embodiments of the present invention include many changes, modifications, and equivalents within the spirit and clauses of the accompanied claims. The features described and/or illustrated with respect to one embodiment may be used in one or more other embodiments in the same or similar way, may be combined with the features in other embodiments, or may take place of those features.

BRIEF DESCRIPTION OF THE DRAWINGS

The drawings described herein are for illustration purposes only and are not intended to limit the scope of the disclosure of the present invention in any way. In addition, the shapes, the scales, and the like of the components in the drawings are merely schematic to facilitate the understanding of the present invention, rather than specific limitations thereof. Under the teaching of the present invention, those skilled in the art can select various possible shapes and scales based on specific conditions to implement the present invention.

Figure 1:
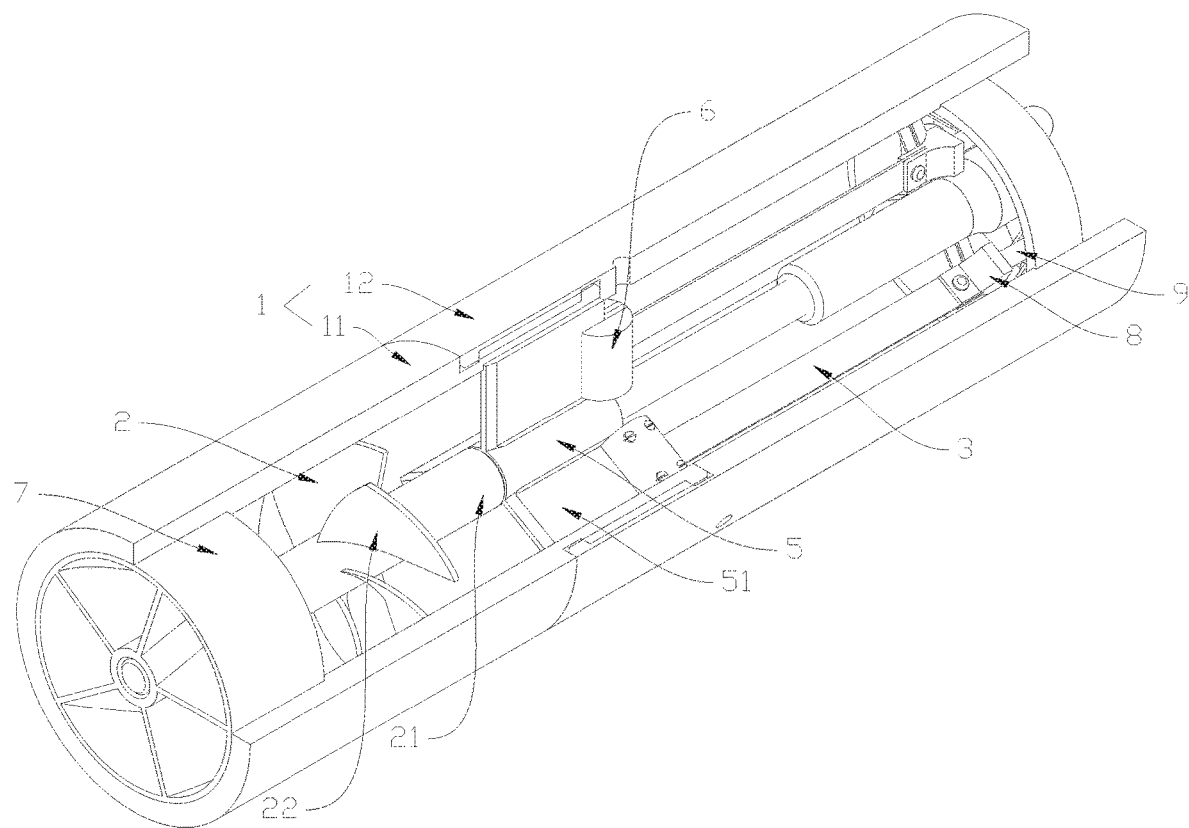
FIG. 1 is a stereo structural view of a downhole power generation device according to an embodiment of the present invention.

The reference numerals:

1: housing; 11: upper outer barrel; 12: lower outer barrel; 2: rotating wheel; 21: shaft; 211: step; 22: blade; 3: piezoelectric bimorph; 4: striking mechanism; 5: lower guide vane mechanism; 51: lower guide vane portion; 6: connecting member; 7: upper guide vane mechanism; 8: counterweight member; 9: touched member; 10: guiding member; 101: guiding groove.

DETAILED DESCRIPTION OF THE PREFERRED EMBODIMENTS

The details of the present invention can be more clearly understood from the drawings and the descriptions of the specific embodiments of the present invention. But the specific embodiments of the present invention described herein are only for the purpose of explaining the present invention, while cannot be construed as limitations to the present invention in any way. Being taught by the present invention, those skilled in the art can conceive of any possible modification based on the present invention, which should be regarded as falling within the scope of the present invention. To be noted, when an element is described as being "disposed/provided" on another element, it may be located on another element directly, or there may be an intermediate element. When an element is described as being "connected to" another element, it may be connected to another element directly, or there may be an intermediate element. The terms "mounted" and "connected" should be broadly interpreted, such as a mechanical or electrical connection, or an internal communication between two elements, or a direct connection, or an indirect connection through an intermediate medium, and the specific meanings of the above terms can be understood by those of ordinary skill in the art based on particular circumstances. The terms "vertical", "horizontal", "upper", "lower", "left", "right" and the like used herein are just for the purpose of description, rather than indicating a unique embodiment.

Unless otherwise defined, all technical and scientific terms used herein have the same meanings as commonly understood by technicians in the technical field of the present application. The terms used in the Specification of the present application are only for the purpose of describing the specific embodiments, rather than limiting the present application. The term "and/or" used herein includes any and all combinations of one or more of the related items listed.

Figure 2:
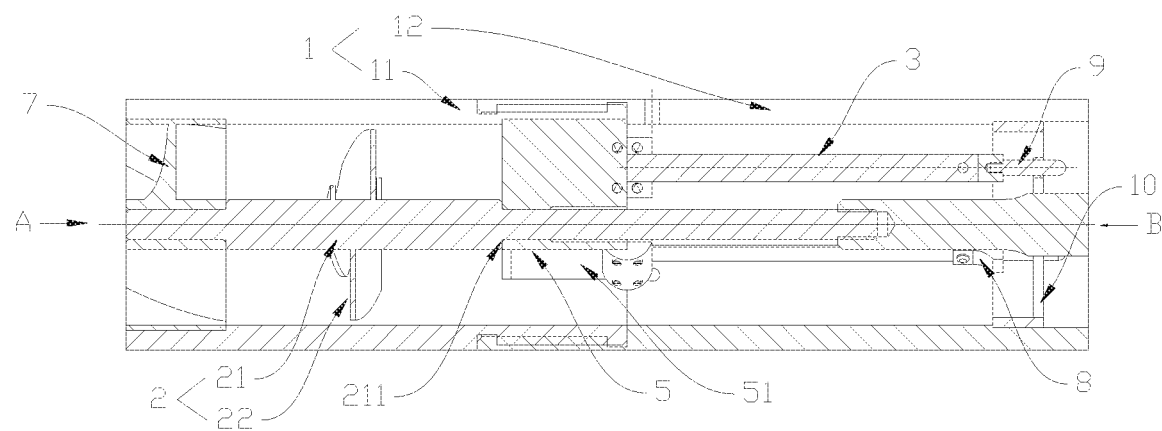
FIG. 2 is a cross-sectional view of a downhole power generation device according to an embodiment of the present invention.

In order to collect energy for waterflooding so as to provide stable and continuous electrical energy to prolong or even avoid the replacement of the downhole power supply equipment, the present application proposes a downhole power generation device. FIG. 1 is a stereo structural view of a downhole power generation device according to an embodiment of the present invention. FIG. 2 is a cross-sectional view of a downhole power generation device according to an embodiment of the present invention.

As illustrated in FIGS. 1 and 2, the downhole power generation device in the present application may comprise: a housing 1 extended axially; a rotating wheel 2, a striking mechanism 4 and a piezoelectric bimorph 3 provided in the housing 1; wherein the piezoelectric bimorph 3 is axially extended and circumferentially distributed around an axis of the housing 1, one end of the piezoelectric bimorph 3 is fixed, the rotating wheel 2 is in transmission connection with the striking mechanism 4, the rotating wheel 2 can be rotated by fluid to drive the striking mechanism 4 to rotate, the striking mechanism 4 can touch the other end of the piezoelectric bimorph 3 during rotation so that the piezoelectric bimorph 3 vibrates back and forth.

The downhole power generation device in the present application is connected into a separate-zone waterflooding downhole device. When separate-zone waterflooding is performed through the separate-zone waterflooding downhole device, the water flow will pass through the housing 1 of the downhole power generation device in the present application. In the housing 1, the water flows from the rotating wheel 2 towards the piezoelectric bimorph 3, and the rotating wheel 2 is driven to rotate under the impact of the water flow. Since the rotating wheel 2 is in transmission connection with the striking mechanism 4, the rotating wheel 2 drives the striking mechanism 4 to rotate, so that the striking mechanism 4 periodically touches the other end of the piezoelectric bimorph 3 during the rotation and goes away therefrom after the touch. Since the piezoelectric bimorph 3 is circumferentially distributed around the axis of the housing 1 and one end of the piezoelectric bimorph 3 is fixed, the other end of the piezoelectric bimorph 3 will vibrate back and forth. The piezoelectric bimorph 3 can generate electricity during the back-and-forth vibration. Thus, the downhole power generation device can continuously supply power to the load through the current generated by the piezoelectric bimorph 3. When the waterflooding is stopped, there is no water flow to drive the rotating wheel 2 to rotate, and the entire piezoelectric power generation device stops generating electricity.

The downhole power generation device in the present application can convert the kinetic energy of the water flow into mechanical energy, and further convert the mechanical energy into electric energy through the piezoelectric bimorph 3, while the electric energy is generated persistently along with the continuous water flow during the waterflooding process. The electric energy generated by the downhole power generation device may be led out via wires and then supplied to a load such as the battery or a power consumption device through corresponding rectifying circuit. The structure of the downhole power generation device can meet the volume requirement for being placed into the downhole device, so that it can be connected to the separate-zone waterflooding device and placed underground to provide stable and continuous electric energy for a power consumption system such as the separate-zone waterflooding device, thereby prolonging or even avoiding the replacement of the downhole power supply equipment and increasing the waterflooding cycle.

In order that the downhole power generation device in the present application can be better understood, it will be further explained and demonstrated below. As illustrated in FIGS. 1 and 2, the housing 1 is extended axially, and it may be substantially an elongated barrel. The upper and lower ends of the barrel run through and a flow channel can be formed therebetween for the inflow and outflow of the fluid.

As illustrated in FIGS. 1 and 2, the rotating wheel 2 is provided in the housing 1 and rotatable on a radial surface of the housing. The rotating wheel 2 may specifically comprise a shaft 21 and a blade 22 provided on the shaft 21, and the shaft 21 and the blade 22 may be integrally formed. The fluid entering the housing 1 flows in an axial direction of the housing, so as to impact the blade 22 of the rotating wheel 2 and drive the rotating wheel 2 to rotate.

As illustrated in FIGS. 1 and 2, a plurality of piezoelectric bimorphs 3 are circumferentially distributed around the axis of housing 1. In a specific embodiment, the number of the piezoelectric bimorphs 3 may be three, and an angle between adjacent two of the piezoelectric bimorphs 3 is 120 degrees. Of course, the number of the piezoelectric bimorphs 3 may be adjusted according to the required power generation capacity, which is not limited herein.

One end of the piezoelectric bimorph 3 is fixed. And each piezoelectric bimorph 3 is extended in the axial direction of the housing 1. In a feasible embodiment, one end of the piezoelectric bimorph 3 may be fixedly connected to the housing 1 just provided that one end of the piezoelectric bimorph 3 does not rotate along with the rotating wheel 2. The striking mechanism 4 is in transmission connection with the shaft 21 of the rotating wheel 2, and may be located downstream of the rotating wheel 2. The rotating wheel 2 can drive the striking mechanism 4 to rotate, and the striking mechanism 4 is provided with a striking portion extended in a radial direction of the housing 1. The other end of the piezoelectric bimorph 3 is located at the striking portion of the striking mechanism 4, so that the striking portion can touch the other end of the piezoelectric bimorph 3 during the rotation of the striking mechanism 4 to vibrate the piezoelectric bimorph 3 back and forth. And a vibration direction of the piezoelectric bimorph 3 is perpendicular to the radial direction of the housing 1. In this way, the piezoelectric bimorph 3 can generate electricity during the back-and-forth vibration, so that the downhole power generation device continuously supplies power to the load through the current generated by the piezoelectric bimorph 3.

Figure 3:
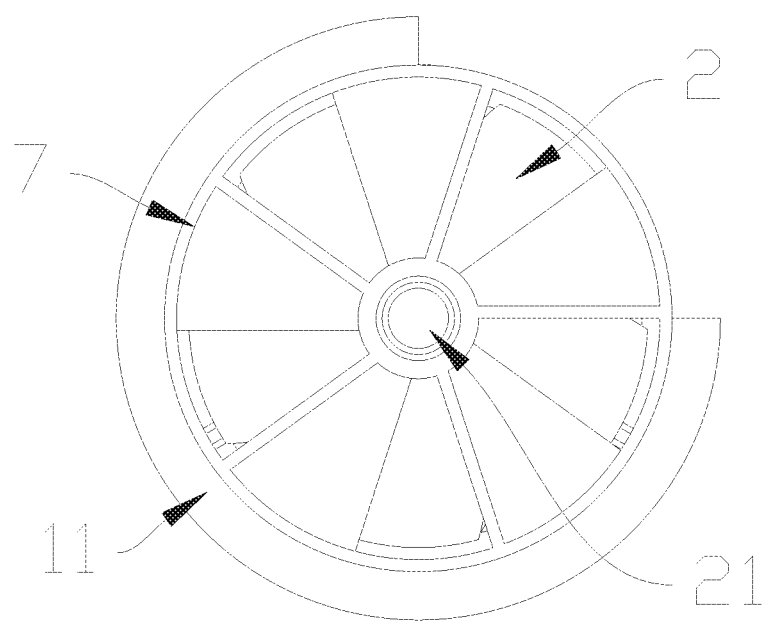
FIG. 3 is a view in direction A in FIG. 2.

In a preferred embodiment, FIG. 3 is a view in direction A in FIG. 2. As illustrated in FIGS. 1 to 3, an upper guide vane mechanism 7 may be provided upstream of the rotating wheel 2 to sleeve the shaft 21 of the rotating wheel 2. The center of the upper guide vane mechanism 7 has a through hole so that the shaft 21 of the rotating wheel 2 can penetrate into the upper guide vane mechanism 7. Meanwhile, the upper guide vane mechanism 7 further comprises an outer frame of a shape matching a shape of an inner wall of the housing 1, so that a side wall of the upper guide vane mechanism 7 and the inner wall of the housing 1 abut against each other for a position limitation. The outer frame of the upper guide vane mechanism 7 is formed with an upper guiding blade from which the fluid flows. And the upper guiding blade generates a rectifying effect on the fluid, so that the fluid can stably drive the rotating wheel 2 to rotate at a certain flow rate. The upper guide vane mechanism 7 and the shaft 21 of the rotating wheel 2 can rotate relative to each other, so that the upper guide vane mechanism 7 does not affect the rotation of the rotating wheel 2 driven by the fluid, and the upper guide vane mechanism 7 can locate the shaft 21 of the rotating wheel 2 at the center of the housing 1.

In a preferred embodiment, as illustrated in FIGS. 1 and 2, the downhole power generation device may further comprise: a lower guide vane mechanism 5 sleeving the shaft 21 of the rotating wheel 2, located downstream of the rotating wheel 2, wherein the lower guide vane mechanism 5 comprises a plurality of radially extended lower guide vane portions 51 which are fixedly connected to the housing 1. The lower guide vane mechanism 5 is located upstream of the piezoelectric bimorph 3 to convert the fluid passing through the rotating wheel 2 into a nearly laminar flow state, thereby further improving the vibration of the piezoelectric bimorph 3.

Specifically, the housing 1 may comprise an upper outer barrel 11 and a lower outer barrel 12 connected to the upper outer barrel 11, and a clamped connection or a threaded connection may be employed between them, which is not limited herein. Since the upper outer barrel 11 and the lower outer barrel 12 are detachably connected to each other, the lower guide vane mechanism 5 can be easily fixed to a joint between the upper outer barrel 11 and the lower outer barrel 12. For example, the lower guide vane portion 51 of the lower plate guide mechanism 5 may be inserted or clamped onto the upper outer barrel 11 or the lower outer barrel 12. The center of the lower guide vane mechanism 5 has a through hole, and the shaft 21 of the rotating wheel 2 passes through the through hole. The shaft 21 of the rotating wheel 2 is rotatable in the through hole of the lower guide vane mechanism 5, thus, the lower guide vane mechanism 5 is fixed by means of the housing 1 to prevent a rotation thereof. Meanwhile, the lower guide vane mechanism 5 can locate the shaft 21 of the rotating wheel 2 at the center of the housing 1.

In order to avoid the upper guide vane mechanism 7 and the lower guide vane mechanism 5 from sliding on the shaft 21 of the rotating wheel 2 axially, the shaft 21 of the rotating wheel 2 may be provided with corresponding step 211, so as to limit the upper guide vane mechanism 7 and the lower guide vane mechanism 5 axially, and effectively prevent the upper guide vane mechanism 7 and the lower guide vane mechanism 5 from sliding onto the blade 22 of the rotating wheel 2.

In a more preferred embodiment, as illustrated in FIGS. 1 and 2, a connecting member 6 is connected to the lower guiding blade to fix one end of the piezoelectric bimorph 3. Specifically, the number of the lower guiding blades of the lower guide vane mechanism 5 may be equal to the number of the piezoelectric bimorphs 3. Every two connecting members 6 may clamp one piezoelectric bimorph 3 in addition to the lower blade guide portion 51 of the lower guide vane mechanism 5, and then the two connecting members 6 are locked with corresponding bolts or screws, so that the two connecting members 6 firmly fix lower blade guide portion 51 and one end of the piezoelectric bimorph 3.

As illustrated in FIG. 1, a side surface of the connecting member 6 away from the piezoelectric bimorph 3 is an arc surface. The lower guide vane mechanism 5 converts the fluid passing through the rotating wheel 2 into a nearly laminar flow state. When the fluid flows through the connecting member 6, a vortex street effect is generated on the fluid by the arc surface of the connecting member 6, thereby further improving the vibration of the piezoelectric bimorph 3.

Figure 4:
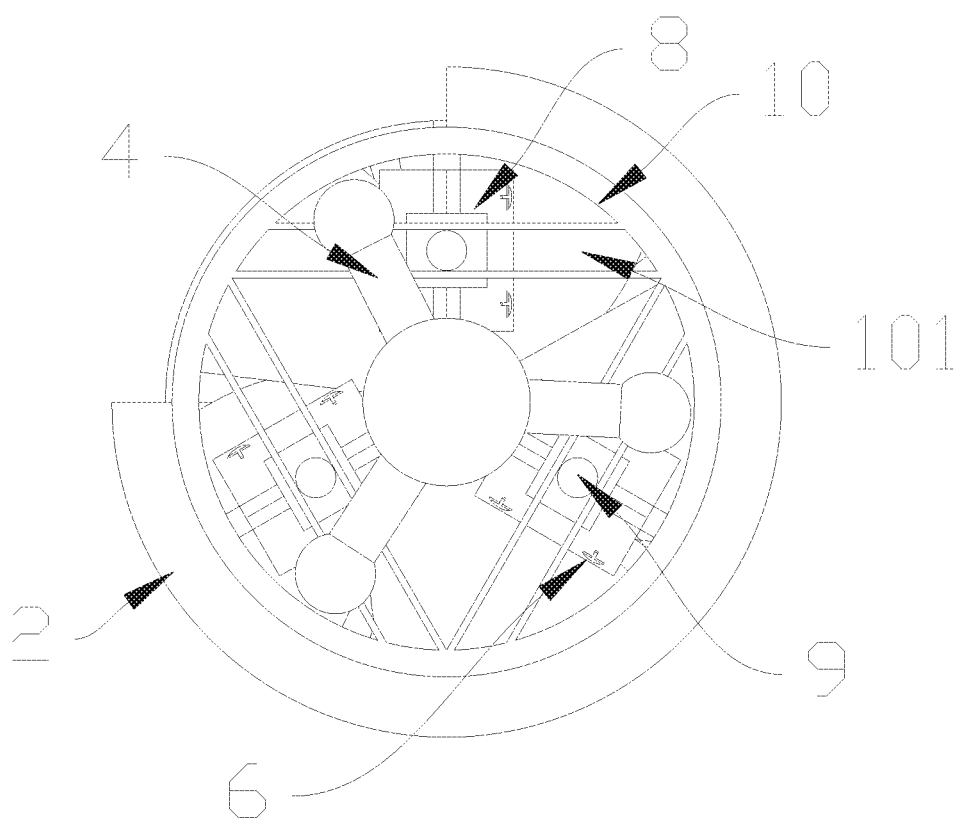
FIG. 4 is a view in direction B in FIG. 2.

In a preferred embodiment, FIG. 4 is a view in direction B in FIG. 2. As illustrated in FIGS. 1, 2 and 4, in order to to increase the vibration duration and amplitude of the piezoelectric bimorph 3 after the striking mechanism 4 touches the piezoelectric bimorph 3 for one time, the counterweight member 8 is connected at the other end of the piezoelectric bimorph 3. Since the piezoelectric bimorph 3 is in the fluid inside the housing 1, the fluid resistance is large when the piezoelectric bimorph 3 vibrates, and the counterweight member 8 can increase the inertia of the piezoelectric bimorph 3 during vibration, thereby improving the power generation capacity of the piezoelectric bimorph 3.

In a preferred embodiment, as illustrated in FIGS. 1, 2 and 4, the counterweight member 8 is connected to a touched member 9 which can be touched by the striking mechanism 4 during rotation. The encapsulation material on the surface of the piezoelectric bimorph 3 is brittle and the piezoelectric bimorph 3 cannot bear a large external force directly. Meanwhile, in order to ensure the insulation effect of the piezoelectric bimorph 3 in a water environment, the surface encapsulation of the piezoelectric bimorph 3 should not be subject to a single concentrated force as much as possible. Therefore, the touched member 9 connected to the piezoelectric bimorph 3 can be touched by the striking mechanism 4, so that the other end of the piezoelectric bimorph 3 is touched indirectly, and the piezoelectric bimorph 3 vibrates.

In a preferred embodiment, the piezoelectric bimorph 3 in the prior art cannot be twisted since it is substantially sheet-shaped, otherwise it may be failed or damaged. As illustrated in FIG. 4, the housing 1 may be provided therein with a guiding member 10 which has a radial guiding groove 101 perpendicular to the housing 1, and the touched member 9 is embedded into the guiding groove 101. The guiding member 10 further comprises an outer frame of a shape matching a shape of an inner wall of the housing 1, so that a side wall of the guiding member 10 and the inner wall of the housing 1 abut against each other for a fixation. The guiding groove 101 is connected to the outer frame. Of course, the guiding groove 101 and the outer frame may be integrally formed. The number of the guiding grooves 101 can be determined according to the number of the piezoelectric bimorphs 3. In one embodiment, when the number of the piezoelectric bimorphs 3 is three, the number of the guiding members 10 is three, and an angle between adjacent two of the guiding grooves 101 is 60 degrees. When the guiding member 10 is provided, the other end of the piezoelectric bimorph 3 can only be forced to vibrate in the direction of the guiding groove 101. On one hand, this form of vibration allows the piezoelectric bimorph 3 to utilize its effective power generation area to the utmost extent to obtain a maximum power generation effect that cannot be achieved by directly touching the piezoelectric bimorph 3. On the other hand, such a vibration can prevent a certain degree of twisting of the piezoelectric bimorph 3 under the impact of the fluid, thereby protecting the piezoelectric bimorph 3 and prolonging its service life.

The present application further provides a separate-zone waterflooding device, comprising any downhole power generation device described above, which can generate electricity during the downhole separate-zone waterflooding by the separate-zone waterflooding device, so as to supply power to the separate-zone waterflooding device or to the rechargeable battery therein.

All articles and references disclosed, including the patent applications and publications, are incorporated herein by reference for all purposes. The phrase "substantially composed of . . . " describing a combination should include the determined elements, compositions, components or steps, and any other element, composition, component, or step which substantively does not affect the basic novel features of the combination. When the term "comprise" or "include" is used to describe the combination of elements, compositions, components or steps herein, embodiments substantially consisting of the elements, compositions, components or steps are also contemplated. Herein the term "may" is used to indicate that any described attribute covered by "may" is optional. Multiple elements, compositions, components, or steps can be provided by a single integrated element, composition, component or step. Alternatively, a single integrated element, composition, component or step may be divided into multiple separate elements, compositions, components or steps. The disclosure "a/an" or "one" used to describe the elements, compositions, components or steps is not intended to exclude other elements, compositions, components or steps.

Each embodiment in the Specification is described in a progressive manner. Each embodiment lays an emphasis on its difference from other embodiments, and the same or similar parts of the embodiments can refer to each other. The above embodiments are only used to describe the technical ideas and characteristics of the present invention, and the purpose is to allow those skilled in the art to understand the contents of the present invention and implement them accordingly, rather than limiting the protection scope of the present invention. Any equivalent change or modification made according to the spirit essence of the present invention shall fall within the protection scope of the present invention.

The invention claimed is:

1. A downhole power generation device, comprising:
a housing having an axis, wherein the housing extends along the axis; and
a rotating wheel provided in the housing, a striking mechanism provided in the housing and a piezoelectric bimorph provided in the housing, wherein the piezoelectric bimorph is axially extended and circumferentially distributed around the axis of the housing, a first end of the piezoelectric bimorph is fixed, the rotating wheel is in transmission connection with the striking mechanism, the rotating wheel is rotated by fluid to drive the striking mechanism to rotate, and the striking mechanism touches a second end of the piezoelectric bimorph during rotation so that the piezoelectric bimorph vibrates back and forth,
further comprising a lower guide vane mechanism sleeving a shaft of the rotating wheel and located downstream of the rotating wheel, wherein the lower guide vane mechanism comprises a plurality of radially extended lower guide vane portions which are fixedly connected to the housing.

2. The downhole power generation device according to claim 1, wherein a connecting member is connected to the lower guide vane to fix the first end of the piezoelectric bimorph.

3. The downhole power generation device according to claim 2, wherein the connecting member further comprises a plurality of connecting members, wherein two of the plurality of connecting members clamp the piezoelectric bimorph, and wherein a side surface of a first of the two connecting members, the first of the two being positioned further away from the piezoelectric bimorph, is an arc surface.

4. The downhole power generation device according to claim 1, wherein the housing comprises an upper outer barrel and a lower outer barrel connected to the upper outer barrel, and wherein the lower guide vane mechanism is fixed to a joint between the upper outer barrel and the lower outer barrel.

5. The downhole power generation device according to claim 1, further comprising an upper guide vane mechanism sleeving a shaft of the rotating wheel and located upstream of the rotating wheel.

6. The downhole power generation device according to claim 1, wherein the second end of the piezoelectric bimorph is connected to a counterweight member.

7. The downhole power generation device according to claim 6, wherein the counterweight member is connected to a touched member which is touched by the striking mechanism during rotation.

8. The downhole power generation device according to claim 7, wherein a guiding member is provided in the housing, wherein the guiding member has a guiding groove perpendicular to the radial direction of the housing, and wherein the touched member is embedded into the guiding groove.

9. The downhole power generation device according to claim 8, wherein the piezoelectric bimorph further comprises three piezoelectric bimorphs and an angle between two adjacent piezoelectric bimorphs is 120 degrees, and wherein the device further comprises three guiding members and an angle between the guiding grooves of two adjacent guiding members is 60 degrees.

10. A separate-zone waterflooding device, comprising a downhole power generation device according to claim 1.

* * * * *